Oct. 24, 1933.                D. E. LINDQUIST                1,931,666

JOINT

Filed Nov. 30, 1931

INVENTOR,
David E. Lindquist,
Delos G. Haynes,
ATTORNEY.

Patented Oct. 24, 1933

1,931,666

UNITED STATES PATENT OFFICE 1,931,666

JOINT

David E. Lindquist, Port Huron, Mich., assignor to Mueller Brass Co., Port Huron, Mich., a corporation of Michigan Application November 30, 1931
Serial No. 577,942

2 Claims. (Cl. 285—115)

This invention relates to connecting means, and with regard to certain more specific features, to connecting means for joining pipe fittings with pipes, rods and the like.

Among the several objects of the invention may be noted the provision of an improvement upon the construction set forth in the United States Patent No. 1,770,852 to Charles A. Hill for Connecting means, dated July 15, 1930; the United States Patent No. 1,776,502 to Leo E. Gresley and Samuel Eusey for Connecting means, dated September 23, 1930; and the United States Patent No. 1,890,998 to David E. Lindquist for Joint.

More particularly, this application has for its purpose the provision of a joint wherein proper alignment is assured with increased strength and rigidity, but wherein the structure for effecting this improvement is not open to the objection that gases and the like are trapped in the joint to weaken the same or prevent proper capillary distribution of sealing material over the surfaces; and the provision of a construction of the class described which may be economically carried out without the addition of separate parts and wherein the present method of assembly by the user may be adhered to. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawing, in which is illustrated one of various possible embodiments of the invention, Fig. 1 is a side elevation showing the application of the invention;

Similar reference characters indicate corresponding parts throughout the several views of the drawings.

Figure 1:
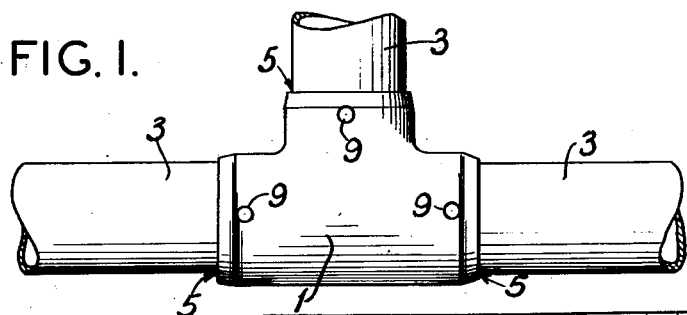
Figure 2:
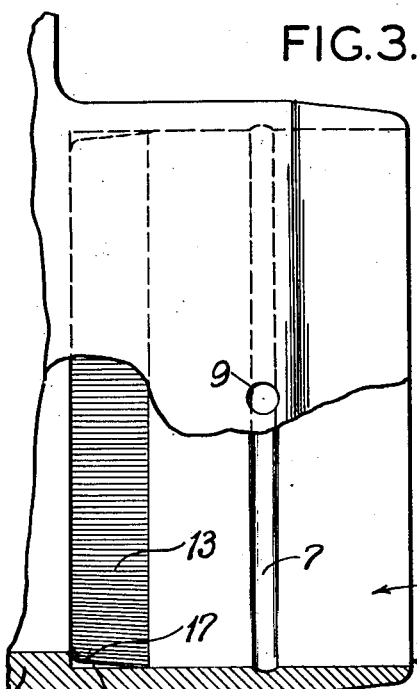
Fig. 2 is an enlarged, fragmentary, longitudinal section, showing the invention in detail.
Figure 3:
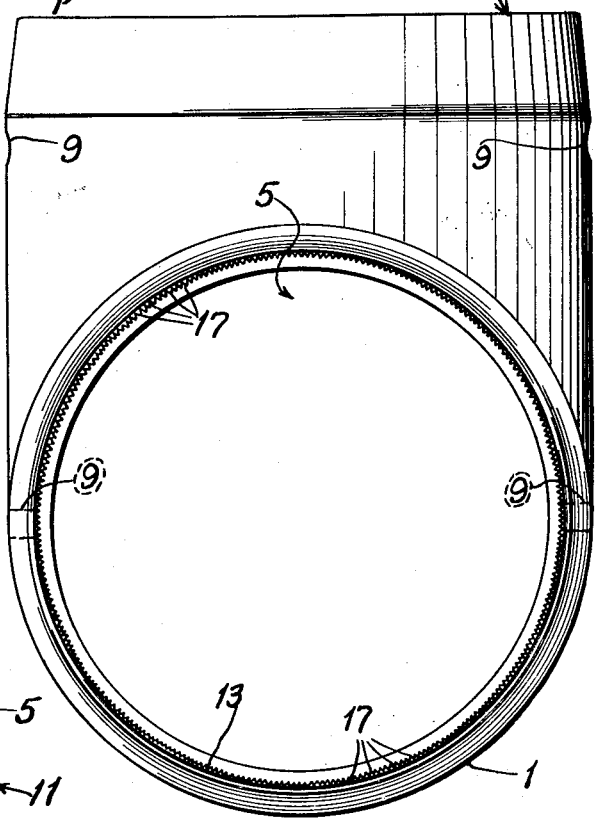
Fig. 3 is an end view of Fig. 2.
Figure 4:
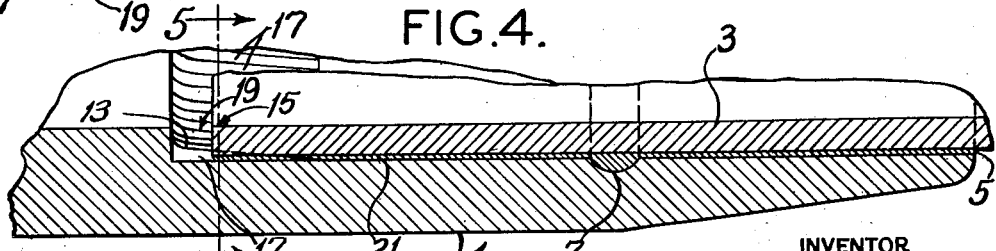
Fig. 4 is a fragmentary longitudinal section showing the application of a pipe to a fitting with sealing material in place; and, Fig. 5 is a detail section taken on line 5—5 of Fig. 4.
Figure 5:

Referring now more particularly to Fig. 1, there is shown at numeral 1 a T-fitting adapted to receive in the openings thereof lengths of pipe 3, said openings being indicated by numerals 5. This is the general type of fitting referred to in this application but it will be understood that variations of the same may be employed such as nipples, crosses, elbows and the like.

The openings or sockets 5 are arranged to receive the pipes with a sliding fit of a capillary order, that is, when sealing material, such as solder or the like is used between each socket 5 and the entered pipe, said sealing material will travel over the surface of the joint by capillary action. It is to be understood that for suitable capillary action to take place, the surfaces will be cleaned so that the solder will adhere thereto. For effecting capillarity a clearance of a few thousandths of an inch between pipe and fitting surfaces have been found to be proper.

A groove 7 is located peripherally in each socket 5 and communicates with the exterior by means of an opening 9 through which the sealing material may be applied. The sealing material flows around the groove 7 and from there is distributed capillarily. It is to be understood that the sealing material may also be applied from the end of the joint such as from the location indicated by numeral 11, from whence it will proceed by capillary attraction. Ordinarily, however, the application of sealing material to the opening 9 is sufficient.

As stated in my said Patent No. 1,890,998, it is sometimes desirable that the base of the socket 5 be tapered inwardly as indicated herein at numeral 13 so that the entering end 15 of the respective pipe 3 will be wedged into place. This feature has several advantages, among which are increased strength and rigidity and proper alignment so that more assurance is had of a substantially annular space between the pipe and the fitting so that the capillary action is more uniform.

The present invention effects an improvement in this mode of connection by applying to the tapered portion 13 a peripheral series of longitudinal corrugations or serrations 17. This is done by knurling or broaching or the like. The purpose of these serrations is to prevent the jamming action of the pipe from entirely cutting off the said capillary space, from the interior of the fitting, so that gas binding cannot occur when the sealing material is applied, as well as to enhance the centering and trueing functions of my said Patent No. 1,890,998. It will be seen that the region 19 interiorly of the fitting is in communication with the capillary space 21 by way of the serrations 17. Thus sealing material which enters the groove 7 can spread inwardly into the joint without the generated gases binding. The gas and/or air is pushed rearwardly through the serrations 17 and into the fitting, permitting the sealing material or solder to travel after it and to seal the end of the pipe.

It will be appreciated that the serrations should not be made excessively coarse so that the sealing material flows freely into the fitting but should be fine enough so that they themselves effect capillary tubes, which, after they are filled with sealing material, present a frictional blockage to free running of the material into the fitting. For this purpose I have found for example, that corrugations of 1/32 inch pitch and 90 degree angle are suitable. The corrugations are preferably carried out below the surface of the tapered portion 13 and at the groove are a substantial continuation of the socket 5.

It will be understood that the fineness of the corrugations may be arranged so that only trapped gases are left out of the joint and the passage of sealing material entirely blocked because of the fineness. Or, the corrugations may be made relatively more coarse so that the sealing material passes through them but at a very slow rate so that sealing is effected in the corrugation but not an uncontrolled flow to the interior. The distinction will be found to be useful in certain instances. For instance, if a very small pipe is being joined, it may be desirable to prevent substantially all leakage of solder into the fitting; whereas if a relatively large joint is being made a slight leakage therein is of no consequence.

In order to make a joint, the socket and pipe are suitably cleaned. The pipe is then entered into the socket and forced against the serrations or corrugations 17, which to an extent cut into the pipe. It is thus wedged into place more effectively than in the case where a smooth tapered portion is used at this region. Solder is then introduced into the opening 9, from whence it flows around the groove 7 and is distributed by capillary action over the interior surfaces between the pipe and the fitting. In proceeding rearwardly it forces gas out ahead of it through the serrations and introduces itself into the corrugations 17 and there also seals the pipe, provided the serrations have not been made so fine as to entirely prevent all entry of solder. Air which is present, as well as gases formed, is forced out and is prevented from trapping.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawing shall be interpreted as illustrative and not in a limiting sense.

I claim:

1. A pipe fitting comprising a body having a socket adapted to telescopingly receive a pipe or like member, said socket having a front substantially cylindrical portion and a rearward inwardly tapering portion, said inwardly tapering portion being provided with serrations parallel to the axis of the socket, said serrations having inward sharp edges whereby they are adapted to receive and cut into to hold the said pipe or like entering member.

2. A joint comprising, in combination, a receiving portion having a socket, said socket comprising a front substantially cylindrical portion and a rearward inwardly tapering portion, said inwardly tapering portion being provided with serrations parallel to the axis of the socket, said serrations having inward sharp edges, and a straight cylindrical member comprising any portion of straight pipe adapted to be received by said socket, said member being in diameter slightly less than the diameter of the cylindrical front portion of the socket, but greater than the minimum diameter of said tapering portion, whereby, upon telescoping said member into said socket, the end of said member engages the serrated tapering portion of the socket in such manner that the serrations bite into and hold the said member in position with relative firmness, whereby said member is positioned such that its side walls are positioned a uniform distance from the walls of the front, cylindrical portion of the socket, and any slight diametrical defects of said member are corrected, the uniform annular space between said member and said front portion than being of such dimension as to induce a capillary flow of a then liquid sealing material introduced therein, throughout said space, the unfilled troughs of said serrations then functioning as outlets to relieve the gases trapped within the fitting as the liquid sealing material is introduced into position.

DAVID E. LINDQUIST.